(12) United States Patent
Ehlers

(10) Patent No.: US 8,014,905 B2
(45) Date of Patent: Sep. 6, 2011

(54) SYSTEM AND METHOD FOR DEMAND LIMITING RESISTIVE LOAD MANAGEMENT

(75) Inventor: Gregory A. Ehlers, Dacula, GA (US)

(73) Assignee: Ranco Incorporated of Delaware, Wilmington, DE (US)

( * ) Notice: Subject to any disclaimer, the term of this patent is extended or adjusted under 35 U.S.C. 154(b) by 726 days.

(21) Appl. No.: 11/683,139

(22) Filed: Mar. 7, 2007

(65) Prior Publication Data
US 2007/0213880 A1 Sep. 13, 2007

Related U.S. Application Data

(60) Provisional application No. 60/780,591, filed on Mar. 9, 2006.

(51) Int. Cl.
G05D 17/00 (2006.01)
H02J 1/10 (2006.01)
H02J 3/46 (2006.01)
H02J 3/14 (2006.01)
H02J 1/04 (2006.01)

(52) U.S. Cl. ............ 700/295; 700/296; 307/24; 307/31; 307/35; 315/294; 315/295; 315/158; 315/159; 315/308

(58) Field of Classification Search .................. None
See application file for complete search history.

(56) References Cited

U.S. PATENT DOCUMENTS

| | | | | |
|---|---|---|---|---|
| 4,060,709 A | * | 11/1977 | Hanson | 219/130.33 |
| 4,216,384 A | * | 8/1980 | Hurley | 307/39 |
| 4,479,164 A | * | 10/1984 | Siegel | 361/235 |
| 4,913,038 A | * | 4/1990 | Burkett et al. | 99/331 |
| 5,508,878 A | * | 4/1996 | Pecore | 361/195 |
| 5,572,438 A | * | 11/1996 | Ehlers et al. | 700/295 |
| 5,574,653 A | * | 11/1996 | Coomer et al. | 700/286 |
| 5,598,566 A | * | 1/1997 | Pascucci et al. | 713/324 |

(Continued)

FOREIGN PATENT DOCUMENTS
EP 0 555 315 7/1982
(Continued)

OTHER PUBLICATIONS
International Search Report dated Jan. 31, 2008.
(Continued)

Primary Examiner — Albert Decady
Assistant Examiner — Sunray Chang
(74) Attorney, Agent, or Firm — Howard & Howard Attorneys PLLC

(57) ABSTRACT

An electricity demand limiting system for limiting the electricity consumption of at least one resistive load device. The demand limiting system includes a consumption controller associated with the resistive load device that is operable to infinitely vary the amount of electricity being consumed by the load device. The consumption control device is in operative communication with a load controller such that the load controller can generate a control signal to affect the operation of the consumption control circuit. Preferably, the consumption control circuit is a triac-based circuit that receives the control signal from the load controller and limits the amount of electricity consumed by the resistive load device. The load controller can receive input signals from sensors monitoring the electricity delivery system or from the premise electricity meter. Further, the load controller can receive external inputs from a third party that determine the operation of the load controller in limiting the electricity demands of the resistive load device.

21 Claims, 1 Drawing Sheet

U.S. PATENT DOCUMENTS

| | | | |
|---|---|---|---|
| 5,652,503 A * | 7/1997 | Urban et al. | 323/235 |
| 5,924,486 A | 7/1999 | Ehlers et al. | |
| 6,246,831 B1 * | 6/2001 | Seitz et al. | 392/486 |
| 6,528,957 B1 * | 3/2003 | Luchaco | 315/307 |
| 6,633,823 B2 * | 10/2003 | Bartone et al. | 702/57 |
| 2004/0075343 A1 | 4/2004 | Wareham et al. | |
| 2004/0254654 A1 | 12/2004 | Donnelly et al. | |
| 2006/0187600 A1 | 8/2006 | Brown et al. | |

FOREIGN PATENT DOCUMENTS

| | | |
|---|---|---|
| WO | 02/21660 | 3/2002 |

OTHER PUBLICATIONS

Written Opinion dated Sep. 17, 2009.

* cited by examiner

SYSTEM AND METHOD FOR DEMAND LIMITING RESISTIVE LOAD MANAGEMENT

CROSS REFERENCE TO RELATED APPLICATION

The present application is based on and claims priority to U.S. Provisional Patent Application Ser. No. 60/780,591, filed on Mar. 9, 2006.

BACKGROUND OF THE INVENTION

The present invention relates to an electricity demand limiting system for resistive loads that is controlled using at least one of a schedule, a real time condition control signal, a user defined willingness to pay decision table, a device or premise demand management system, a thermostatic control system or other monitoring and control systems or method.

In some states and countries where the major form of energy available to a customer premises is electricity, demand metering systems are deployed to encourage customers to keep their total demand as flat as possible. Demand, from an electricity supplier's perspective, is the instantaneous need for energy to satisfy loads within a customer premise. Resistive loads create a fairly flat demand on the energy delivery system when operating at full capacity. Resistive loads typically are large heating elements that consume a large amount of energy when energized and typically operate under the control of a thermostatic controller. Because the load is resistive and large, it represents a significant portion of the total demand placed on an energy delivery system by the customer premise.

Reactive loads, on the other hand, are typically rotating devices like motors. Reactive loads produce an initial high demand for energy to get the stationary armature moving. Once in motion, the total demand is reduced as the load reaches operating speed. These two very different types of loads make up the majority of the electric load found in a premise. Because the utility serving the premise has to provide enough energy to meet the demand placed on it at any time, the concept of demand metering has been adopted in some areas.

Demand metering continuously monitors the total demand at a premise and records the peak demand for each billing period. In some utility power supply systems outside the US, the meters on each home are programmed with a disconnect relay that will cut all power to the home if the demand exceeds a predetermined level. These relays can only be reset by the utility and are designed to force premise owners to stay under designated demand levels.

In the United States, the rate used for energy billing to commercial/industrial and some residential accounts is based upon the peak demand for the billing period and the total energy consumption. The definition of a "peak period" can vary from an instantaneous peak at one extreme, to the highest 15 minute energy demand period recorded for the month. The peak demand is then used to set the rate at which all consumption for the month will be billed. If the demand is low, the rate could, for example, be 6 cents per KWH of energy or less; if the demand is high, it could be as much as 25 cents per KWH. By using demand metering, the utility can recover the costs associated with meeting the maximum demands of the consumer, while not penalizing those customers who keep their demand on the system at a more consistent level.

SUMMARY OF THE INVENTION

The present invention generally relates to a system and method for limiting the electricity consumption of a resistive load device located within a premise. The method and apparatus allows the electricity demand limiting system to control the demand for electricity at either a single resistive load device within the premise or the demand for electricity for the entire premise.

The demand limiting system includes a consumption control circuit that is positioned between the electricity delivery system and the resistive load device. Preferably, the consumption control circuit is a triac-based control circuit that is operable to regulate the electricity consumption of the resistive load device at an infinite number of levels. When the consumption control circuit receives a control signal indicating that electricity consumption should be limited, the triac-based control circuit clips portions of the input sine wave to reduce the amount of electricity available for consumption by the resistive load device.

The electricity demand limiting system further includes a load controller that is in operative communication with the consumption control circuit. The load controller can be co-located or integrated together with the consumption control circuit or it can be a separate co-located device or can be a separate remote device. The load controller can generate a control signal to the consumption control circuit based upon either time or condition based parameters determined by the load controller. As an example, the load controller can generate the control signal to the consumption control circuit at regular time intervals that correspond to energy demand peaks and/or Time of Day (TOD) utility tariff price schedules from the electricity provider and/or manager of the energy delivery system. The load controller can generate the control signal to the consumption control circuit in real time based on the real time demand for energy from the electricity provider and/or manager of the energy delivery system. In addition, the load controller can receive control parameters from one or more of the owner/occupants of the premise that includes the resistive load device or from an authorized third party responsible for managing energy consumption. Based upon the control parameters, the load controller can generate the control signal to the consumption control circuit to limit the demand for electricity available to the resistive load device.

In addition to receiving control parameters from a user, the load controller can receive input signals that are received from sensors/monitors that sense and/or monitor various other parameters of the electricity delivery system. As an example, the load controller can receive inputs from sensors/monitor systems that monitor either the voltage or the frequency of the electricity being provided on the electricity delivery system. If either the voltage or frequency drop below standard values, such as 120 volts or 60 Hz, the load controller can generate a control signal to the consumption control circuit to limit the demand for electricity by the resistive load device. In this manner, the electricity demand limiting system provides a grid friendly system to limit electricity demand during either low voltage or low frequency conditions present on the electricity delivery system.

In addition to controlling the operation of a single resistive load device, the load controller can communicate with or receive signals or be integrated into an electricity meter for the entire premise that includes the resistive load device. Based upon the demand for electricity being consumed by the entire premise, the load controller can generate a control signal to one or more consumption control circuits to limit the demand for electricity by their associated resistive load devices. In this manner, the electricity demand limiting system can control a single resistive load device or a plurality of resistive loads within a premise based upon the amount of electricity being consumed by the entire premise.

In one embodiment, the load controller can monitor the amount of electricity consumed by the resistive load device and determine the thermodynamic gain characteristics of the resistive load device and historical run time and consumption data of the resistive load device. Based upon these historic values, the load controller can determine the required thermal recovery demand and ability of the resistive load device and control the operation of the resistive load device to meet the demand accordingly. An example would be an electric hot water heater that recognizes a demand for hot water at 6:30 AM daily and is able to satisfy that demand in 30 minutes. This could represent a demand for or usage of 35 gallons of hot water for a shower. If this demand pattern is consistent, the load control device can learn to manage the reheating of water at a much slower rate and at a greatly reduced demand level. This type of pattern recognition and management of high resistive loads can result in a significant reduction on the total demand for energy on the energy delivery system. The management of resistive or emergency heating strips in a central heating system can be managed in an similar fashion.

In addition to being utilized with a single resistive load device, the demand limiting system can be utilized with a plurality of resistive load devices located within a single premise. In such an embodiment, the load controller for each of the resistive load devices would communicate with each other to coordinate the demand limiting for the entire premise or a single load control device could manage the entire premise and communicate with a plurality of consumption control circuits. It is contemplated that the demand limiting can be based upon the type of resistive load device being managed. As an example, certain resistive load devices may be given a higher priority such that the energy consumption for these high-priority devices would be limited only after other load devices had been limited.

BRIEF DESCRIPTION OF THE DRAWINGS

The drawings illustrate the best mode presently contemplated of carrying out the invention. In the drawings.

DETAILED DESCRIPTION OF THE INVENTION

Figure 1:
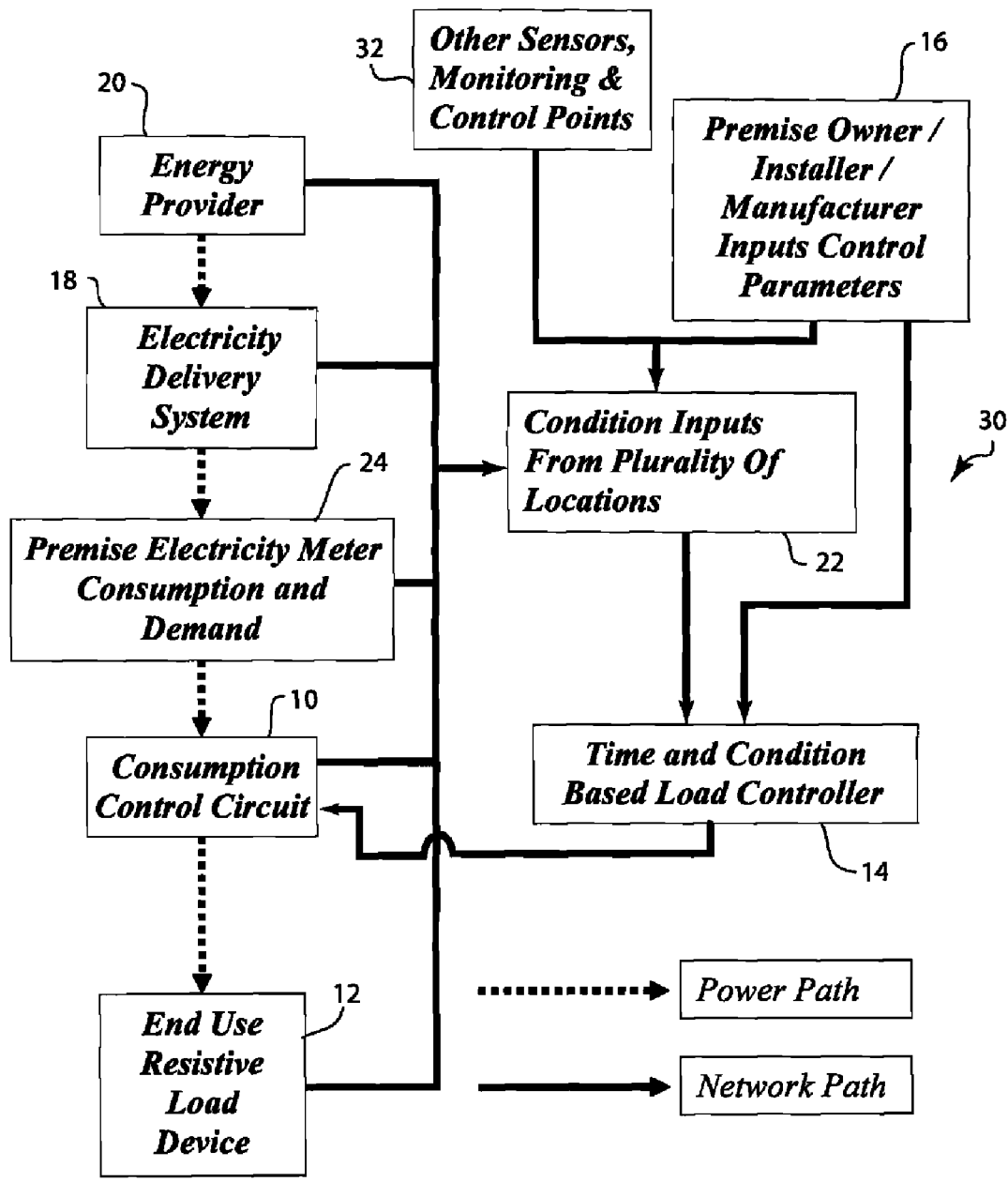
FIG. 1 a schematic illustration of the communication between the time and condition based controller, the consumption control circuit, the load appliance and input sources.

The invention combines a number of technologies into a system that will manage demand of resistive loads. The invention is designed to limit and/or manage the impact of resistive loads on the premise and the energy delivery system. This management is based on control parameters supplied to the system by anyone of a number of sources, including but not limited to, the premise owner, the installer of the system, an energy provider, the manufacturer of the appliance, the manufacturer of the control system and an energy services company.

The core of the resistive load demand limiting system shown in FIG. 1 is a triac-based control circuit 10 similar to the one described in U.S. Pat. No. 5,652,503, the disclosure of which is incorporated herein by reference. This triac control circuit 10 regulates the flow of power to a resistive load 12 by clipping the sine wave of the AC power using an embedded processor. If half the sine wave is clipped using this circuit, the total demand is cut by 50%. As a result, this triac-based control circuit 10 can infinitely vary the amount of energy going to a resistive load 12. U.S. Pat. No. 5,652,503 is directed to a control system to control the surface heating elements of a modern glass top range to provide the same infinite variable control as is found in a gas cook top.

The second component of the system 30 is a time or condition based load controller 14 that can be combined with the triac-based control circuit 10 or can be a separate device, as shown in FIG. 1. The purpose of the time or condition based load controller 14 is to manage the operation of the triac-based control circuit 10 by issuing a control signal to the control circuit 10, based on either a schedule or a conditional trigger or a combination of the two. In its simplest form, the time or condition based load controller 14 is a clock that may have a calendar date awareness capability and schedule of times and dates or days stored in a memory, that generates a control signal that controls at least one status indicator to denote an on or off condition. This on or off condition is combined with a means of denoting a percentage of operation from 0% to 100% for each of the two status indicator states. As an example, in this simplistic form, the load controller 14 will be associated with an electric water heater and the clock will be programmed to correspond with a power company time of day (TOD) tariff that specifies times and dates or days when "on peak" and "off peak" pricing periods are in effect.

For an illustrative example, the TOD tariff from Mesa, Ariz. will be used. The TOD tariff specifies that during off peak pricing periods, energy is 3 cents per KWH and during the on peak pricing period, the price of energy is 16 cents per KWH. The load controller 14 can be programmed by one of many responsible parties, including but not limited to, the premise owner, the energy provider, a service provider, a utility, an installer or the manufacturer. In this example it is assumed that the programming specifies to generate a control signal to turn the status indicator off when the off peak pricing period is in effect and to turn it on when the on peak pricing period is in effect.

Associated with the off and on peak pricing periods, a series of input control parameters 16 will also include instruction indicators or relationship ties that associate the signal state with a percentage of operating capacity that the triac-based consumption control circuit 10 should assume. For this example, it is assumed that the consumption control circuit 10 is programmed to operate at 100% of its normal capacity in the off peak periods and at 50% of its capacity during the peak pricing periods. This example is only provided as an example and is not intended to limit the system to its simplest form.

In the simplest form example, the energy system 30 will heat water at its rated capacity during off peak periods and will heat water at 50% of its rated capacity during on peak periods. The system 30, by its design, could support a plurality of different states, each having a different percentage of operation associated with it. The clock and calendar function used to program time periods within the time and condition load controller 14 is not limited in its scope and can accommodate a complete calendar to accommodate seasonal changes, holidays, special events and conditions.

An alternative to the time based simple approach described above would be to have the system 30 follow the voltage or frequency detected on the delivery system. Under this scenario, the system 30 would monitor both voltage and frequency on the electricity delivery system 18 and would reduce the system demand dynamically as the voltage and/or frequency dropped. As the voltage or frequency returned to normal levels, the system 30 would in turn return to full demand. Dynamic load following can be applied to voltage and frequency independent of one another or in combination. Dynamic load following can also be restricted to voltage only or frequency only if desired. By applying load following technologies, the system will make the device it is attached to "grid friendly" by dynamically reducing resistive demand during periods of high demand.

The load following technique mentioned above would, as an illustrative example only, operate the resistive load at full capacity when the measured control element (voltage or frequency or both) was at its normal level. In the U.S., the normal voltage today would be 120V and the frequency would be 60 Hertz. If the voltage was the measured control element and it dropped to 110V, then the controller 14 associated with the resistive load might issue a control signal to drop its demand by 25%. The load controller 14 could drop the load demand by an additional 25% if the voltage dropped to 105V and might operate at a 75% total reduction when 100V was detected. Below 100V, the load 12 could be disconnected from the grid entirely.

When the load following technique is based upon frequency control, if the frequency dropped from 60 Hz to 59.9 Hz, the control system associated with the resistive load might issue a control signal to drop its load 25% and in a similar fashion drop an addition 25% at 59.8 and 59.7 Hz. Below 59.7 Hz, the device 12 would separate from the grid 20 entirely. The ability of the load controller 14 to react within a few cycles of the power sine wave or voltage dropping is possible, which makes this control a real-time instantaneous event controller. The above examples are purely illustrative in nature and are not to be considered limiting. By its design, the time and condition based load controller 14 can vary the amount of power in an infinitely variable manner and therefore steps of 25% would not be necessary. The load controller 14 could vary the demand by the resistive load in an infinitely variable manner making the changes to the level of demand smooth and grid friendly. In addition, the degree of change could be programmed to start and end at any level using the measured control element inputs, such as sensors and monitoring points 32. The relationship between the demand and the measured control element being a programmable item are customized to meet the needs of the application and the goals of the control programs in effect.

A more elaborate implementation of the system will learn the operating characteristics of the resistive load appliance 12. As an example, the water heater of the above example will learn how quickly it can reheat the water at different percentages of its rated capacity, or it may come preprogrammed from the manufacturer with that knowledge or may be programmed to meet the specific needs of the local utility to qualify for participation in a conservation program or initiative. The appliance will also have a means of recording the demand for hot water as a function of time and its actual recovery time from each demand, which will be stored by date and time in a usage history matrix at the appliance time and condition load controller 14, or at a central controller, or both. An example would be an electric hot water heater that recognizes a demand for hot water at 6:30 AM daily and is able to satisfy that demand in 30 minutes. If this demand pattern is consistent, the load control device can learn to manage the reheating of water at a much slower rate at this time of day and at a greatly reduced demand level. This type of pattern recognition and management of high resistive loads can result in a significant reduction on the total demand for energy on the energy delivery system. The management of resistive or emergency heating strips in a central heating system can be managed in an similar fashion.

By combining usage and run time history with the control parameters guiding its operation, the control system 30 for the resistive appliance 12 can manage its demand on the energy delivery system to best meet the predicted needs of the premise.

The control parameters in this example include, but are not limited to, learned usage and recovery rates, real time and TOD and fixed energy costs, availability and demand signals, reduction and control parameters related to signals or sensed or monitored power characteristics and tariff related parameters together with other inputs that may be received from a condition data steam source. Under this example, the rate of consumption or instantaneous demand for energy will be managed to achieve reheating of the water in a timeframe to meet the historical consumption. This reheating management process does not need any other parameters to perform this function but will use any and all available data to manage the process in the most cost effective and efficient manner. As a result, the water heater may have to operate at full operating capacity or may operate at some lesser percentage of full capacity to meet the historical need. In all cases however, until that need is satisfied, the energy consumed by the water heater will be at a constant rate and presumably at less than full rated capacity as warranted.

The simplest example above uses a time of day (TOD) tariff to illustrate the programming of the time and/or condition based load controller 14. In the same manner in which the system controlled the water heaters operation based on a TOD price tariff, the load controller 14 can be programmed in a similar manner to generate a control signal to reduce total demand during a peak demand tariff period. An example of such a demand tariff can be found in Scottsdale, Ariz. where on weekdays during specific hours, demand is measured at each premise to determine the billing rate for the month. Using the example above, if the water heater is controlled during this period to reheat at 50% or 75% of its normal rate, the total demand the appliance places on the energy delivery system can be reduced by 25% to 50%. Since water heaters normally draw 4,800 watts or 4.8 KW, this reduction will have a significant impact on the overall demand at the premise.

The time and condition load controller 14 has primarily been discussed up to this point as maintaining and controlling the consumption control circuit 10 using a clock and calendar or schedule basis (time related). The "condition" part of the load controller 14 provides the system with an additional method of managing demand that is more dynamic. The load controller 14 uses input data from an external source 22 to generate a control signal to help manage the operation of the consumption control circuit 10. This external source, as an example, can be a whole premise meter 24 that communicates, in real time, the total demand of the premise. Using a suitable network, the meter can communicate with any number of load controllers 14 or to a central load controller in the premise.

In an illustrative example, the device 12 being managed is the water heater. The premise owner can specify a level of operation at which the water heater is to operate using the time and date scheduling matrix similar to the earlier example. The control can then be expanded and enhanced by specifying at least one alternative level of operation the water heater will operate at if the total premise demand exceeds a set limit. This alternative level of operation can include a dynamic real time control that will keep the total demand within a specified economic range based on the total premise demand. In this manner the load controller 14 can dynamically manage the total demand of an appliance to limit the total demand and consumption of the premise. In addition, because multiple resistive loads can be managed in this way within a premise, a more elaborate implementation can be deployed. In the more elaborate implementation, the entire premise can be controlled by a single master time and condition controller or communication can exist between multiple time and condition load controllers 14, either directly or through a master controller. This inter-communication will facilitate an improved balancing of the demand among all competing loads. This balancing feature will include priority load management established by a responsible party to ensure that the most critical loads receive priority over discretionary ones.

Other types of condition control inputs from external sources, shown by reference numerals 22 and 32, can include but are not limited to:

1. Direct real time or scheduled pricing data from the energy supplier or agent.
2. Direct real time or scheduled tariff signals from the energy supplier or agent.
3. Direct real time or scheduled load control commands from the energy supplier or agent.
4. Occupancy awareness sensors that signal the presence of someone in the premise.
5. Total cost of energy consumed data for managing to a specified budget total, by day, by week, by month or billing period as established by the premise bill payer
6. Direct real time commands for % reduction events, issued by the energy provider or agent within a demand management program.
7. Direct commands for scheduled time and date % reduction event requests issued by the energy provider or agent within a demand management program.
8. Direct management control signals from the premise owner to override established controls for a specified amount of time.
9. Direct suspension of operation or alternate control programming based on occupancy status changes such as holiday schedules on weekdays or gone on vacation mode for extended vacant periods.

Monitoring, programming and controlling of resistive loads using the triac-based control system 30 in it simplest form to this point have been limited in scope to the individual appliance level. This function, however, can also be managed centrally in a premise over a premise network or remotely over a wide area network. The network can be RF, cable, telephone, PLC or direct wire based. The central time and condition load controller 14 of a premise based system can be a personal computer, a home automation controller, an electronic thermostat or any other suitable "always on" processor. The suitable central controller must be capable of communicating over the necessary internal and external networks and controlling the operational state of at least one triac-based consumption control circuit 10. The central load controller must possess a means of interfacing with the premise owner to facilitate necessary data inputting, display and other operational aspects of the system. To illustrate this implementation, an electronic thermostat used to manage the environmental condition within a premise, will be used as the central time and condition load controller 14. The load device 12 will be network enabled, permitting it to receive control signals from external sources if so equipped The thermostat will further be network enabled, permitting it to manage the operation of at least one communicating consumption control circuit 10. Programmable thermostats functionally support a clock and calendar programming function to manage the indoor environment. This programming function can be expended to include other devices like the water heater.

Using the display screen on the thermostat, the premise owner can program a fixed schedule of settings based on utility tariffs using a time and date matrix to manage the water heaters demand. This programming can also be provided over a network to the thermostat from an outside source that is authorized to access and update the control point. It is also possible to directly manage the temperature set point of some networked electric water heaters using the time and date matrix scheduling features of the programmable thermostat. By managing the resistive loads demand level and the thermostat settings, maximum operating efficiency and economic benefit can be achieved. In addition, the thermostat can accept premise owner operational commands used to dynamically manage resistive loads under its control when conditional signaling is provided from an authorized outside source.

The management of these types of external data steams by a central controller is more fully disclosed in U.S. Pat. No. 5,924,486, the disclosure of which is incorporated herein by reference. The use of a central premise controller, typically includes a user friendly input and display means to make programming and reporting of results more intuitive through the use of graphic support tools. An example of such a central control system that could be used to manage this resistive load demand limiting system is disclosed in U.S. Pat. No. 5,572,438, which is included here in its entirety.

It should be noted that not all resistive loads in a premise would be candidates for direct control by the invention. An example would be the heating element of a stove or oven. If managed by the system, additional control interfaces would need to be employed in the temperature control system of the oven to ensure that the temperature needed to perform a cooking application could be achieved and maintained until complete. As a result, demand management of the oven heating element can only be reduced to a level where it can still produce the desired temperature setting for each cooking application. This will require coordination between the "time and condition controller" and the temperature management system of the oven to properly manage the triac-based controller. The "time and condition controller" will utilize tariff and user supplied parameters and limits to determine the best method to manage the demand. The temperature control management system will provide input on the requirements for energy to meet the temperature set points as an external condition data stream to the "time and condition controller", which will directly influence the demand regulation of the triac-based controller. Similar intercommunications will be necessary for environmental heating systems, to ensure that set points for heating are maintained while reducing overall demand on the power system. This feature when activated will dynamically manage the demand of the resistive loads to achieve the temperature set points needed to satisfy the cooking or heating applications. By using this "use only what's required" parameter setting in the input control parameters to the "time and condition controller" the system can dynamically management total demand for the premise and the appliance to a minimum at all times.

An example of this type of coordinated control would be an oven that is set to 350° F. A traditional oven would energize the heating element to its fully rated limit, placing 100% of its rated demand on the energy delivery system. The oven controller would then measure the oven cavity temperature until it reached 355°. At this point, the oven temperature controller would de-energize the oven heating element and remove 100% of the elements rated demand from the energy delivery system. When the sensed oven temperature falls below 345°, the oven controller would once again energize the heating element and place 100% of its rated load on the delivery system. In contrast, under the "use only what's required" control of the invention, the oven controller would provide energy to the oven heating element on a continuous basis in a fashion that would permit initial heating to occur in an acceptable time frame. Once at operating temperature, the oven controller would reduce the total energy provided to the heating element to a point where the temperature would be maintained at exactly 350°. By managing the continuous flow of energy available to the heating element, the oven controller will provide a more constant temperature, reduce the broad swings in temperature that can occur in traditional ovens and completely eliminate the demand spikes the oven places on the energy delivery system. The same principle can be applied to thermostats and resistive whole premise heating systems or emergency heating strips in heat pump applications. This dynamic management will result in the conservation of natural resources and a flattening the demand profile for the premise and the energy delivery system. This type of resistive demand limiting would provide significant relief to the winter demand peak found in many southern States and would particularly of benefit to the State of Florida, Arizona and New Mexico. This will also result in direct savings for the owner if a demand rate tariff is in effect. Appliances with demand limiting controllers should be eligible for rebate incentives from energy suppliers and/or participation in energy conservation programs designed to limit our dependence on fossil fuel energy resources.

I claim:

1. An electricity demand limiting system for limiting the electricity consumption of at least one resistive load device from an electricity delivery system, the demand limiting system comprising:
a consumption control circuit positioned between the electricity delivery system and the resistive load device; and
a load controller in operative communication with the consumption control circuit to provide a control signal to the consumption control circuit such that the consumption control circuit responsively limits the electricity consumption of the resistive load device, while achieving an established demand associated with the resistive load device, based upon the control signal, wherein the load controller is operable to determine at least one of (1) the thermodynamic gain characteristics of the resistive load device and (2) the historical run and recovery time data of the resistive load device, wherein the load controller generates the control signal to operate the consumption control circuit to achieve a desired thermal recovery or temperature as a function of the at least one of (1) the thermodynamic gain characteristics of the resistive load device and (2) the historical run and recovery time data of the resistive load device, where the load controller infinitely regulates the electricity consumption of the resistive load device as a function of a parameter of the control signal, the demand associated with the at least one resistive load including a set point and a predetermined time and the control signal is generated to limit the consumption of electricity by the resistive load and to meet the demand.

2. The demand limiting system of claim 1 wherein the consumption control circuit is a triac-based circuit operable to infinitely regulate the electricity consumption of the resistive load device 3. The demand limiting system of claim 1 wherein the load controller generates the control signal based upon an internal timing device contained within the load controller.

4. The demand limiting system of claim 1 further comprising: a voltage monitoring device operable to detect the voltage on the electricity delivery system and communicate the detected voltage to the load controller, wherein the control signal is based upon the detected voltage.

5. The demand limiting system of claim 1 further comprising: a frequency monitoring device operable to detect the frequency of the electricity delivery system and communicate the detected frequency to the load controller, wherein the control signal is based upon the detected frequency.

6. The demand limiting system of claim 1 further comprising: a premise electricity meter operable to determine the total electricity consumption by a premise including the resistive load device, the premise electricity meter being in communication with the load controller, wherein the load controller generates the control signal to the consumption control circuit based upon the total electricity demand and/or consumption by the premise.

7. The demand limiting system of claim 1 further comprising an input device coupled to the load controller, the input device being operable to receive control parameters from the user, wherein the load controller generates the control signal based upon the control parameters.

8. The demand limiting system of claim 7 wherein the control parameters include demand limits based upon the total cost of electricity consumed.

9. The demand limiting system of claim 1 wherein the consumption control circuit and the load controller are contained within the resistive load device.

10. An electricity demand limiting system, as set forth in claim 1, wherein the at least one resistive load is a water heater, and the thermodynamic gain characteristics includes data related to how quickly the water heater can reheat water at different percentages of its rated capacity.

11. An electricity demand limiting system, as set forth in claim 1, wherein the at least one resistive load is an oven and the thermodynamic gain characteristics includes data related to how quickly the oven can reach a given temperature as a function of percentages of its rated demand.

12. A method of limiting the demand for electricity of at least one resistive load device from an electricity delivery system, the method comprising the steps of:
positioning a consumption control circuit between the electricity delivery system and the resistive load device;
positioning a load controller in communication with the consumption control circuit;
establishing a demand associated with the resistive load device;
determining a need to limit the demand for electricity in the load controller;
determining at least one of (1) the thermodynamic gain characteristics of the resistive load device and/or (2) the historical run and recovery time data of the resistive load device and responsively generating a control signal from the load controller to the consumption control circuit as a function thereof; and
operating the consumption control circuit in response to the control signal to limit the demand for electricity by the resistive load device and to meet the demand associated with the resistive load device while achieving a desired thermal recovery or temperature, where the consumption control circuit infinitely regulates the electricity consumption of the resistive load device as a function of a parameter of the control signal, the demand associated with the at least one resistive load including a set point and a predetermined time and the control signal is generated to limit the consumption of electricity by the resistive load and to meet the demand.

13. The method of claim 12 wherein the consumption control circuit is a triac-based circuit operable to infinitely regulate the electricity consumption of the resistive load device.

14. The method of claim 12 wherein the need to limit the demand for electricity is based upon an internal timing device contained within the load controller.

15. The method of claim 12 further comprising the steps of:
monitoring an electrical characteristic of the electricity delivery system;
determining whether the monitored characteristic varies from a standard parameter; and
generating the control signal from the load controller to the consumption control circuit based upon the difference between the measured characteristic and the standard value.

16. The method of claim 15 wherein the electrical characteristic is the voltage present on the electricity delivery system.

17. The method of claim 15 wherein the electrical characteristic is the frequency of the electricity on the electricity delivery system.

18. The method of claim 12 further comprising the steps of:
monitoring the total electricity demand and or consumption rate of the premise including the resistive load device; and
generating the control signal from the load controller to the consumption control circuit to limit the total electricity demand and/or consumption for the premise.

19. The method of claim 12 further comprising the steps of:
receiving one or more control parameters within the load controller; and
generating a control signal from the load controller based upon the control parameters.

20. A method, as set forth in claim 12, wherein the at least one resistive load is a water heater, and the thermodynamic gain characteristics includes data related to how quickly the water heater can reheat water at different percentages of its rated capacity.

21. A method, as set forth in claim 12, wherein the at least one resistive load is an oven and the thermodynamic gain characteristics includes data related to how quickly the oven can reach a given temperature as a function of percentages of its rated demand.

* * * * *